June 1, 1954 S. EPSTEIN 2,679,867
VENT PIPE AND COUPLING CONSTRUCTION
Filed May 4, 1950 2 Sheets-Sheet 1

SAUL EPSTEIN,
INVENTOR.

HUEBNER, BEEHLER, WORREL,
HERZIG & CALDWELL,
BY ATTORNEYS.

June 1, 1954 S. EPSTEIN 2,679,867
VENT PIPE AND COUPLING CONSTRUCTION
Filed May 4, 1950 2 Sheets-Sheet 2

SAUL EPSTEIN,
INVENTOR.

HUEBNER, BEEHLER, WORREL,
HERZIG & CALDWELL,
BY ATTORNEYS.

Patented June 1, 1954

2,679,867

UNITED STATES PATENT OFFICE 2,679,867

VENT PIPE AND COUPLING CONSTRUCTION

Saul Epstein, Los Angeles, Calif.

Application May 4, 1950, Serial No. 159,957

6 Claims. (Cl. 138—63)

This invention relates to vent pipe and coupling construction, and more particularly to sheet metal vent pipe of double wall construction having formed integral with the ends thereof a new and improved coupling construction for securing corresponding pipe sections or fittings to other sections or fittings of like construction.

Vent pipes of the prior art, particularly those of double wall or insulated construction, have been unwieldy and ordinarily heavy.

Those composed of sheet metal, such as aluminum, have required, in order to secure an effective interfitting connection between sections and fittings, more or less elaborate separate fittings, unions, joints, sleeves and the like separately secured to adjacent ends of the vent pipe sections and fittings to hold the same together. Such couplings and the like, even when initially secured to one end of a vent section, have required separate connection usually by screws, bolts, bands, upsetting deformations and the like to secure proper joints with their mating fitting. Aside from the costliness of such separate coupling connection the additional time, labor and expense involved in their construction and use have been steadily sought to be avoided.

In view of the above considerations, among others, it is an object of this invention to provide a new and improved sheet metal double-walled vent pipe construction.

It is another object of the invention to provide a new and improved coupling for double-walled vent pipe of a preferred sheet metal type.

It is another object of the invention to provide a new and improved combined vent pipe and integral coupling construction of the desired character.

Yet another object of the invention is the provision in a vent pipe and coupling combination of new and improved, more economical, more readily reproducible and installable construction.

The invention likewise contemplates among its objects the provision of a new and improved interfitting joint structure capable of easy and effective assembly on the job and providing satisfactory facile and convenient means for the intentional disconnecting thereof from the normal interlocked position of the parts.

It is moreover among the objects of the invention, in providing improvements over prior art devices heretofore intended to accomplish generally similar purposes, to preserve a desired live air space between the walls of the pipe, to eliminate sheet metal screws, to maintain an unrestricted vent flow, to provide a springlock by the pipe itself, and to minimize destructibility of the joints.

Other and more specific objects and advantages will appear and be brought out more fully in the following specification considered with reference to the accompanying drawings throughout which like parts are designated by like numerals.

In the drawings—

Figure 1:
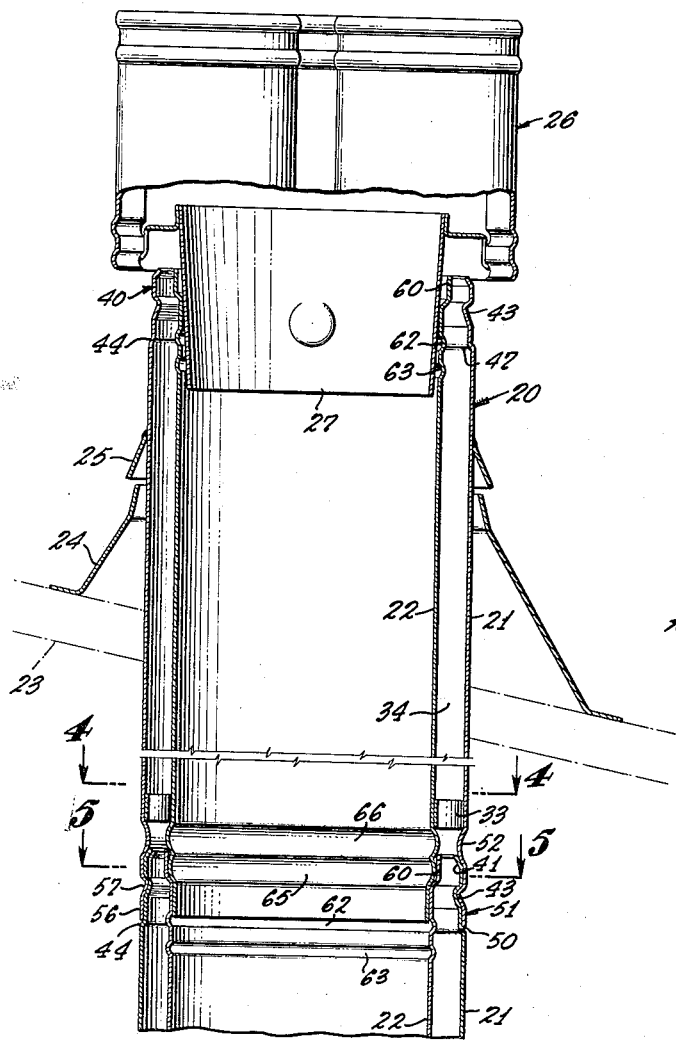
Figure 1 is a vertical sectional view of a double-walled vent pipe embodying this invention.

Referring more particularly to the drawings, there is shown by way of example, but not of limitation, a double-walled vent pipe generally designated by the numeral 20 comprising an outer pipe 21 and an inner pipe 22.

As illustrated, the pipe 20 is shown mounted in a roof 23 where it is supported by a vent flashing 24 and collar 25. A vent cap 26 of the type illustrated in Rubin issued Patent No. D-154,881, is optionally equipped with a depending collar 27 of the type more fully described in my copending application, Serial No. D-6859, now abandoned.

The inner and outer pipes are preferably secured together at their upper ends 28 as by means of large spaced indentations 29, 30 and 31 disposed in any desired number around the outer pipe. Each such indentation in its station of contiguity and conformity to the inner pipe is secured to such inner pipe by any appropriate means as by spot welding the adjacent surfaces together, providing ears, dimpling, crimping or the like.

The pipes 21 and 22 so secured together at their upper ends 28 are held in coaxial alinement by means of any suitable spacer 33, optionally of corrugated or other form preferably frictionally disposed in the space 34 between the pipes 21 and 22. Said spacer 33 may, if desired, be held by spot welding, dimpling or any other appropriate means in any desired position within the space 34 between the two pipes. Such rigid securement of the spacer is not necessary however and mere frictional or pressed positioning thereof between the pipes has been found adequate. Moreover, the shape of the bottom end of the pipe 20 either on the outer pipe 21 or the inner pipe 22 may, as will be explained, be so beaded or grooved as to prevent any other than forcible and deliberate axial removal of the spacer from between the pipes 21 and 22.

Other relatively smaller indentations such as 35, 36 and 37 may be impressed in the upper end of the outer pipe, the inner sides or bottoms 38 of such indentations being preferably slightly spaced from but optionally contacting the external surface of the inner pipe 22. The inner and outer pipes may also be firmly secured together at such lesser indentations 35, 36 and 37, but preferably a mere stabilizing and touching contact without securement is made.

The outer pipe 21—in addition to the indentations, optionally both large and small, spaced symmetrically circumferentially thereof as heretofore described—is formed with a constriction or reduced portion generally designated at 40 at the upper end 28 thereof.

Such reduced portion comprises an inwardly turned rounded edge 41, the radius of which, in longitudinal section, preferably diminishes as a first shoulder 42 is approached.

A groove 43 is formed, preferably approximately midway between the top end 28 of the outer pipe and a limiting shoulder 44. The upper margin 45 of the groove 43 has a steeper side than the opposite 46 thereby rendering the groove more or less hook-shaped in longitudinal section.

A second shoulder 47 is formed between the limiting shoulder or abutment 44 and the groove 43.

Figure 2:
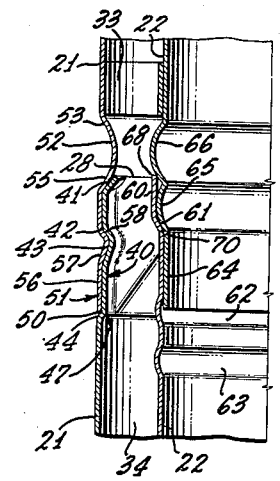
Figure 2 is a detailed view in section as on a line 2—2 of Figure 5.
Figure 3:
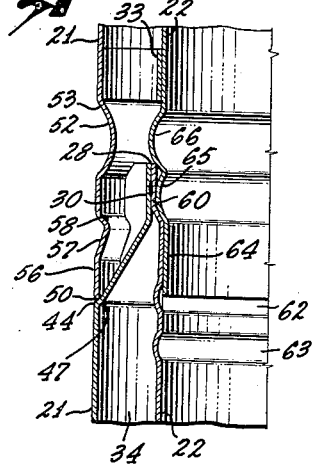
Figure 3 is another detailed view in section as on a line 3—3 of Figure 5.
Figure 4:
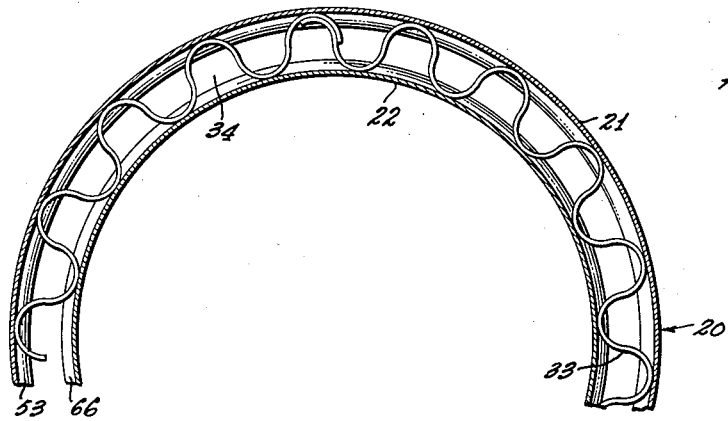
Figure 4 is a cross-sectional view as on a line 4—4 of Figure 1.
Figure 5:
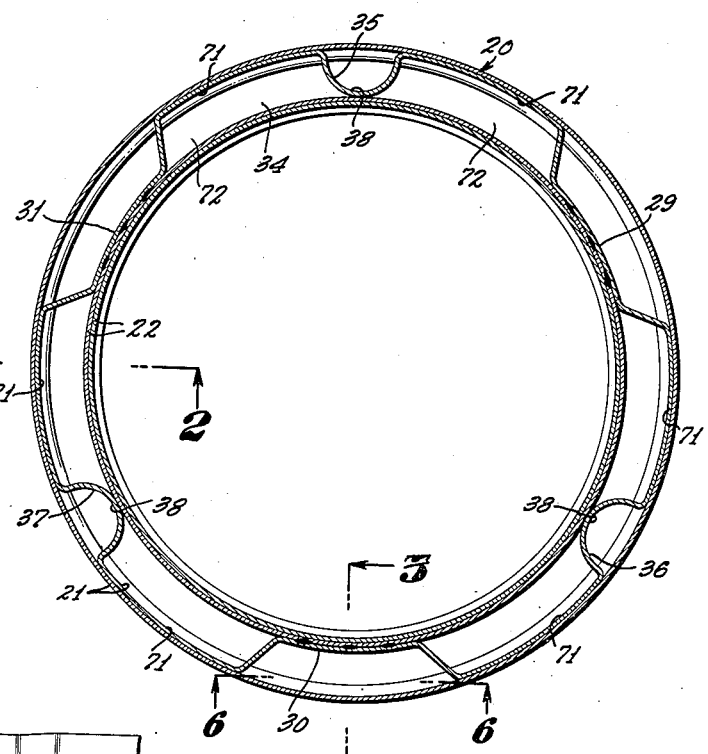
Figure 5 is a cross-sectional view as on a line 5—5 of Figure 1.
Figure 6:
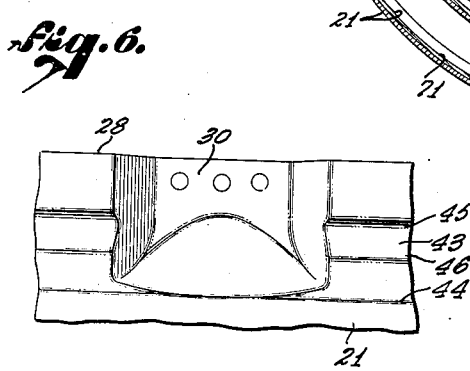
Figure 6 is a detail view of an edge of a vent pipe embodying this invention at one end thereof as seen on a line 6—6 of Figure 5.

The pipe 21 between the abutment 44 and the bottom 50 is straight or otherwise conventionally shaped; but the bottom portion generally designated at 51 is contoured in a complementary manner to the upper end 40, being designed to fit over, telescopically, the corresponding upper end of another double-walled pipe section 20 as illustrated most clearly in Figures 1, 2 and 3.

For such purpose, said bottom end 51 of the outer pipe 21 is formed as with a first internal bead 52, the topmost portion 53 of which may be of any desired contour, but the bottom internal portion 55 of which conforms to the rounded end 41 of the reduced upper end portion.

As may be seen most clearly with reference to Figure 1, the spacer 33 is prevented from removal downwardly from its position in the interpipe space 34 by engagement of its bottom edge against the upper side of the bead 52.

The first shoulder 42, the groove 43 and the second shoulder 46 of the reduced end 40 are matched in the end 51 by a flared end 56 adapted to nest over and conform to said second shoulder 46 a groove 57 adapted to nest in and lock with the groove 43, preferably conforming fully thereto, and a shoulder 58 adapted to accommodate, together with the bead 52, the first shoulder 42 of the reduced end 40 as well as the rounded end 41 as heretofore noted. The groove 57 is, like the groove 43, substantially hook-shaped so that one may conform to and lock within the other.

Thus, in sum, it may be seen by reference to Figures 1, 2 and 3 in particular that the outer pipes 21 have reduced or male ends 40 at their upper ends and flared or female ends 51 at their lower ends for snapping the upper end of a lower pipe 21 into the lower end of an upper corresponding pipe 21.

Contrariwise, the inner pipe 22 of each doublewall pipe 20 has a flared upper end 60 terminating in a shoulder 61 and any number of annular beads or stiffening ribs 62, 63 formed therein spaced axially from said shoulder 61.

The bottom end of the inner pipe has a complementary reduced annular end 64, a first bead 65 slightly expanded in diameter and a more expanded second bead or the like 66.

By said construction, the flared upper end 60 of an inner pipe is adapted to fit over the first bead 65 of the lower end of another corresponding inner pipe, the upper edge 68 of such first inner pipe approximately, if not actually, abutting the second bead 66 as a limiting stop and fitting snugly about, in a preferred pressed but slidable fit over such first bead 65. The shoulder 61 likewise forms an abutment against the lower bead 65 at its lower edge 70. The stiffening ribs 62 and 63, may be included in any desired number, function as rigidifying members. They may optionally be omitted.

By the above construction, sections of doublewalled vent pipe 21 may be telescoped together at their complementary upper and lower ends, respectively, the male or upper end fitting snugly within and between the inner and outer pipes 21 and 22 by a means of the annular space 34 provided therebetween. When similar double-wall pipe sections are lodged together, no further spacer, as 33, is required as the pipes serve as their own spacer.

The arcuate segment 71 between indentations provide resilient spring-lock portions yieldable radially inwardly and tending to flatten when the male and female portions are slipped together, the female portion then likewise tending to flatten particularly in the indented areas 29, 30 and 31, which thereby provide relief for slipping the pipes together. The larger indentations 29, 30 and 31, and optionally also the smaller ones, provide places for welding or otherwise joining the two pipes 21 and 22 as aforesaid. The smaller indentations 35, 36 and 37, however, preferably are unsecured to the inner pipe and rather serve to stabilize the inner pipe within the outer pipe, reduce the size of the end 40 by disposing of an excess of pipe material folded thereinto and forming the same during the formation of such pipe end.

Both the larger and smaller indentations, but particularly the larger, are preferably slightly exposed when the pipe sections are fully interlocked, but whether so slightly exposed or not, provide access for the insertion of a screwdriver or other similar tool, which by bearing against the bottom end 50 of the outer pipe and the abutment 44 at the upper end thereof permits the interlocked pipes 20 to be readily pried apart and unlocked.

If the large indentations are slightly exposed, the small openings thus created communicate between the surrounding atmosphere and the inter-space 34, thereby assisting any insulating draft in such inter-space.

It should also be noted in this connection that air passages 72 are intended to be formed between adjacent indentations thereby permitting a flow of air in the space 34 upwardly around the inner pipes, rendering the space 34 continuous as between interconnected vent pipes 20 to provide a live air space for optimum insulation between the hot flue gases of the innermost pipes 22 and the outside of the vent pipe.

The instant construction also provides for a free and unrestricted flow within the inner vent pipes 22, and, always avoiding inwardly directed impediments, provides little or no practical interference with the upward flow of insulating air as aforesaid within the inner space 34.

The instant construction features provision of a lightweight double-wall vent pipe of preferred aluminum construction, the ends of which resist deformation but which, nonetheless, have easy reformability and resistance to basic destruction that they may be used notwithstanding considerable deformation by smashing, denting or bending the pipe ends. It likewise features a new and improved spring-lock construction, new and improved continuous live air ventilation, and elimination of sheet metal screws and the like, or auxiliary parts and couplings, and giving a resultant, speedier, unrestricted flue flow, stabilized and interlocked inter and outer pipes, more economical pipe assemblies, positive locked qualities coupled with simple unlocking features, when such unlocking is deliberately done, and withal, a design susceptible of fast and economic production.

The instant construction is particularly adapted to formation from dies including a rubber core and corresponding rubber clamps, radially compressible for providing a plurality of interfitting connections and pipes of close tolerance so that the resultant pipes are capable of accurate and practical construction and use as regards the outer pipe from .018 inch sheet aluminum and as regards the inner pipe, .012 inch sheet aluminum, these figures being given as suggestive, not as limiting.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and methods.

Having thus described my invention, what I claim as new and desire to secure by Letters Patent is:

1. A double-walled vent pipe section comprising, an outer resiliently yieldable sheet metal pipe having a male end and a female end, a central wall portion of generally uniform diameter, and an inner sheet metal pipe of smaller diameter than the outer pipe coaxially disposed therein in radial spaced relationship therefrom defining an annular inter-space therebetween, the end of said outer pipe section at said male end having an offset therearound spaced axially from the mouth of said male end toward said female end, an end portion and the mouth of said male end being indented radially inwardly, said indented portion engaging against an adjacent side end portion of the inner pipe, and reinforcing said end portion of said inner pipe, an end portion of said outer pipe section circumferentially adjacent said indented portion defining a generally arcuate segment having a circumferentially extended surface and having a radius of curvature substantially the same as the internal diameter of said female end, said extended arcuate surface being parallel to the axis of the pipe and being adapted to be telescopically slidable within the female end of a corresponding outer pipe section, and means directly securing said inner and outer pipes to one another at said indented portion.

2. A double-walled vent pipe section, comprising an outer resiliently yieldable sheet metal pipe having a male end and a female end, a central wall portion of generally uniform diameter, and an inner sheet metal pipe of smaller diameter than the outer pipe coaxially disposed therein in radial spaced relationship therefrom defining an annular inter-space therebetween, the end of said outer pipe section at said male end having an offset therearound spaced axially from said male end toward said female end, the height of said offset approximating the thickness of the outer pipe wall and correspondingly decreasing the diameter of the outer pipe wall from said offset to the corresponding pipe end, an end portion of said male end being indented radially inwardly, said indented portion engaging against an adjacent side end portion of the inner pipe, and reinforcing said end portion of said inner pipe, an end portion of said outer pipe section circumferentially adjacent said indented portion defining a generally arcuate segment having a circumferentially extended surface and having a radius of curvature substantially the same as the internal diameter of said female end, said extended arcuate surface being parallel to the axis of the pipe and being adapted to be telescopically slidable within the female end of a corresponding outer pipe section, said arcuate segment having a circumferential groove therein between the corresponding outer pipe end and said offset, said outer pipe having an annular groove adjacent said female end and spaced axially from said female end a distance corresponding to that of the annular groove in the male pipe end, said annular grooves being adapted to interlock when the female end of the outer pipe is telescoped with said male end, said female end being then adapted to abut said offset at said male end, said female end then substantially covering said indented portion on said male end, and means directly securing said inner and outer pipes to one another at said indented portion.

3. A double-walled vent pipe section, comprising an outer resiliently yieldable sheet metal pipe having a male end and a female end, a central wall portion of generally uniform diameter, and an inner sheet metal pipe of smaller diameter than the outer pipe coaxially disposed therein in radial spaced relationship therefrom defining an annular inter-space therebetween, the end of said outer pipe section at said male end having an offset therearound spaced axially from said male end toward said female end, an end portion of said male end being indented radially inwardly, said indented portion engaging against an adjacent side end portion of the inner pipe, and reinforcing said end portion of said inner pipe, said indented portion extending axially along said pipe from said male end in the direction of said female end and beyond said offset on said male end, thereby simultaneously defining a vent opening from the atmosphere to said inter-space and an access opening for prying corresponding sections axially apart, an end portion of said outer pipe section circumferentially adjacent said indented portion defining a generally arcuate segment having a circumferentially extended surface and having a radius of curvature substantially the same as the internal diameter of said female end, said extended arcuate surface being parallel to the axis of the pipe and being adapted to be telescopically slidable within the female end of a corresponding outer pipe section, and means directly securing said inner and outer pipes to one another at said indented portion.

4. In a sheet metal vent pipe of the double-walled type comprising coaxial and substantially co-extensive inner and outer pipe portions, the improvement comprising one end of the vent pipe having a mouth formed by deformation and offsetting of the mouth portion of the outer pipe inwardly to engage the inner pipe, means to secure said inner and outer pipes to one another where they are in engagement, said outer pipe being constricted at said one end by means of an offset approximately corresponding to the thickness of said outer pipe wall, portions of said outer pipe between said offset and the end thereof lying in a surface substantially co-extensive with the inner surface of said outer pipe, the other end of the vent pipe defining a mouth in which the inner and outer pipes are retained in spaced relationship forming an annular interspace between the inner and outer pipes, the annular interspace having a radial cross-sectional thickness approximately corresponding to the greatest thickness of the combined inner and outer pipes at said one end, the walls of the vent pipe at said one end adjacent the engagement between said pipes being resiliently flexible to permit resiliently flexible compression of the inner and outer pipes toward one another at said one end whereby said one end of the vent pipe is insertable and telescopically interfittable between the inner and outer walls of an end of another vent pipe having such end corresponding to said other end of the first-mentioned vent pipe, and means for securing said vent pipes in their telescopically interfit relationship against axial separation.

5. In a sheet metal vent pipe as defined in claim 4, said engagement between the inner and outer pipes being at circumferentially spaced positions around said one end of the vent pipe at the mouth thereof.

6. A sheet metal vent pipe as defined in claim 4, said last-named means for securing said vent pipe comprising snap-locking circumferentially oriented grooves and shoulders spaced inwardly from the ends of the outer pipe.

References Cited in the file of this patent

UNITED STATES PATENTS

| Number | Name | Date |
|---|---|---|
| 724,210 | Scherer | Mar. 31, 1903 |
| 1,769,322 | Truax | July 1, 1930 |
| 2,275,902 | Hasenburger et al. | Mar. 10, 1942 |
| 2,512,116 | Siebels | June 20, 1950 |

FOREIGN PATENTS

| Number | Country | Date |
|---|---|---|
| 309,646 | Germany | Dec. 5, 1918 |